June 4, 1935. K. KAISSER 2,004,065

ELECTROLYTIC TREATMENT OF LIQUIDS

Filed March 22, 1933 2 Sheets-Sheet 2

Inventor
Karl Kaisser
per Karl H. May.
Attorney

Patented June 4, 1935

2,004,065

UNITED STATES PATENT OFFICE 2,004,065

ELECTROLYTIC TREATMENT OF LIQUIDS

Karl Kaisser, Munich, Germany

Application March 22, 1933, Serial No. 662,122
In Germany March 27, 1931

14 Claims. (Cl. 204—25)

This invention relates to a new apparatus for the electrolytic treatment of liquids, for example, for the purification of water or for removing certain substances from liquids, such as removing undesired minerals from water.

At present it is common practice to separate within one electrolytic cell the individual chambers which contain the anodes and cathodes by means of porous partition walls, so-called diaphragms. These diaphragms prevent the flow of the liquids from one chamber to the other while they constitute little or no resistance to the flow of the ions from one chamber to the other chamber. Sometimes so-called neutral chambers are provided between the chambers containing the electrodes. In this case, the diaphragm prevents the exchange of liquids contained in the neutral chamber(s) and in the chambers for the electrodes, while the fine pores of the diaphragms permit the travel of the ions towards the cell and electrode where they unload their electric charge.

Often a plurality of cells is arranged in series whereby the liquid to be treated or purified is directed from the neutral chamber of the first cell to the neutral cell of the second chamber and so forth and the finished product is withdrawn from the last cell.

A slight flow condition is maintained within the chambers for the anodes and cathodes of all cells by the supply of new liquid to these chambers securing an overflow and a removal of the products of the electrolytic treatment.

The diaphragms may be compared with a screen of extremely fine meshes since its pores are nothing else but microscopic channel-like openings, the size of which can not be changed. The great disadvantages of diaphragms are well known. It is unavoidable that the diaphragms very easily get clogged, particularly when the liquid to be treated contains colloidal matters which form jelly-like substances which plug the diaphragm after a very short time of use. Furthermore, these diaphragms must be of different quality according to the various conditions of the liquid to be treated, the electrostatic properties of the diaphragm being of great influence. In some cases, depending on the quality of the matter to be treated, the diaphragms are exposed to great mechanical stresses or adverse chemical influences. If, for example, seawater is treated for extraction of minerals in an electrolytic plant equipped with diaphragms, these diaphragms are soon not only plugged by the great amount of salts etc. but also destroyed by the chlorine liberated during the process.

An object of my invention is to provide an apparatus for the electrolytic treatment of liquids, for the removal of certain substances contained in the liquids, demineralization of water, even seawater and the like, without the use of diaphragms.

An object of my invention resides in the provision of screens made up of impenetrable materials instead of diaphragms in front of the electrodes in the apparatus for the electrolytic treatment of liquids.

An object of my invention resides in the provision of means adapted to direct the migration of the ions on predetermined courses to the electrodes in apparatus for the electrolytic treatment of liquids, said means offering at the same time a great resistance against the back-diffusion of the products of the electrolysis.

A further object of my invention resides in the provision of partition means having adjustable openings in apparatus for the electrolytic treatment of liquids, said means directing the flow of the ions to the electrodes and whereby said adjustable openings may be closed altogether and the flow of the ions and liquids be stopped and the electrolytic process entirely interrupted if desired.

An object of my invention resides in the provision of partition means in cells for the electrolytic treatment of liquids which assure the flow of the ions, even if the liquids contain great amounts of clogging substances.

An object of my invention resides in the provision of partition means in cells for the electrolytic treatment of liquids which have a high resistance against corrosion, sustain great stresses and are practically not affected by chemical influences.

An object of my invention resides in the provision of partition means in cells for the electrolysis of liquids which have adjustable openings for controlling the output of the cell and of means acting as one way check, i. e. facilitating the flow in one direction and checking it in the reverse direction.

Another object of this invention resides in the provision of sluice-like partitions in an electrolytic cell for the treatment of liquids which can be closed to positively separate the anode chamber from the cathode chamber and to absolutely interrupt the flow of the electric current, whereby no disturbance whatsoever of the liquid occurs when the sluices are closed.

Further and other objects of the present invention will be hereinafter set forth in the accompanying specification and claims and shown in the drawings, which by way of illustration show what I now consider to be a preferred embodiment of the invention.

In the drawings:

Fig. 1 is an elevational cross section through an electrolytic cell according to my invention.

Fig. 2 is a cross sectional view through an electrolytic cell along line 2—2 of Fig. 1.

Figure 6:
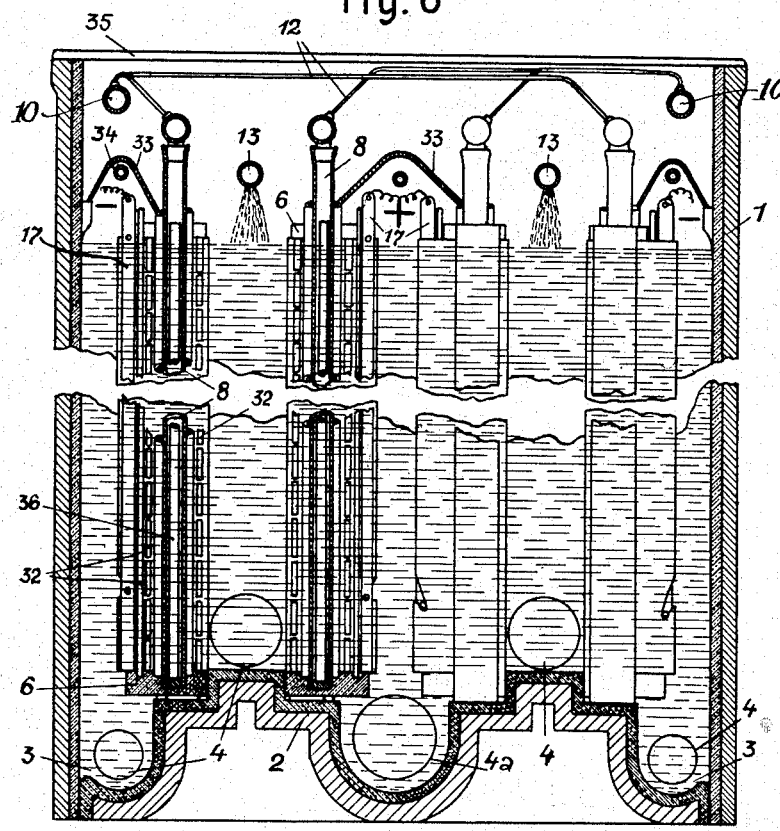
Figure 8:
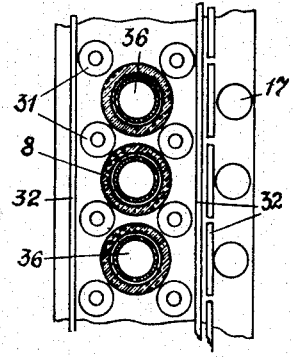

a kind of accumulators which will gradually be filled up by the segregations before they can enter the interior of the cells through the openings of the sluices. By suitable inflation of the tubes 8 (Fig. 3 center) a back flow of the segregations into the interior of the cell can be entirely prevented without interrupting the migration of the ions. The hose may be gently inflated more and more as the process progresses and finally completely pressed against the respective abutments as previously explained. The sluices then form absolutely tight partitions which cannot be penetrated by the ions.

The purified or treated liquid remaining in between the mechanical partitions may then be withdrawn by means of valve 5a and the discharge chambers can be emptied by means of valves 5 and thereafter cleaned out by washing etc.

In the embodiment of my invention as per Fig. 5 the tube-like sluices are replaced by gate sluices. In this case, a gate 30 having suitably distributed openings can be moved up and down by means of levers 29, the gates moving thereby in between the guide-plates 26 and 27 which are mounted to the chamber 1 and have openings 28 which correspond to the openings of the gate 30. In between the gates or sluices and the electrodes are the resistance provisions 14 and 15. By suitable adjustment of gate 30, the sluice openings 28 can be made large or small or completely or partly closed.

The embodiment of my invention according to Figs. 6 to 9, inclusive shows a container 1 with a plurality of electrodes and electrolytic cells. The sluices are of the tubular type, whereby the rubber hose 8 are connected to the compressed air conduits 10 by means of connecting tubes 12. The rubber hose are slipped over interior support rods, tubes etc. 36. The abutments for closing up the passages are made of vertical insulating rods 31 or the like which may be arranged in the corners of a quadrangle or in any other suitable formation around each hose 8. The resistance provisions between the sluices and the electrodes 17 are, in this case, made of insulating plane rods or rails 32 which are composed of two layers. One layer which consists, for example, of glass rails 32 is horizontal, while the parts forming the other layers are vertical. These rails 32 leave small clearances between one another, thus forming a net of crossing passage channels. It is desirable to also have such a screen of glass or similar rods on the other or front side of the rubber sluices 8. On this side, one single layer is sufficient.

Figure 7:
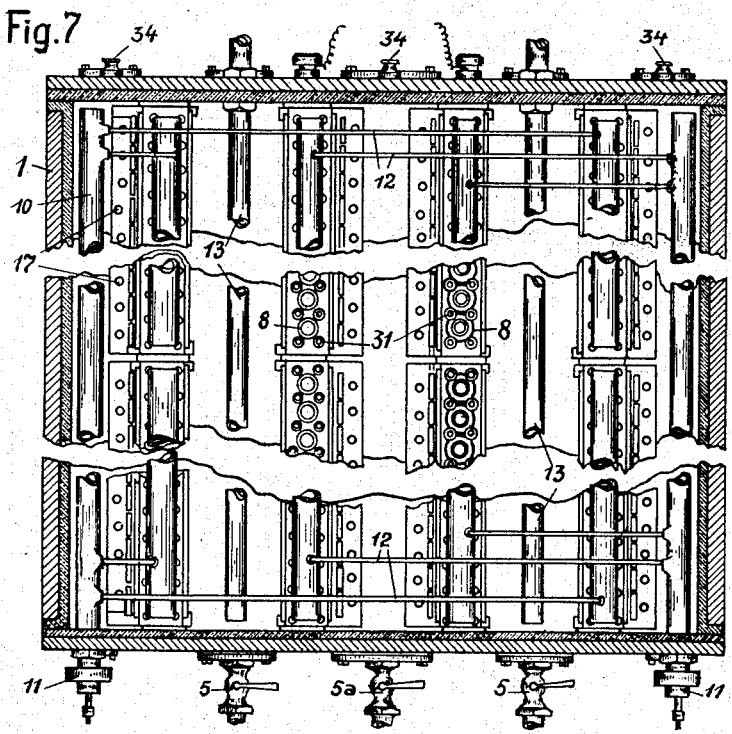
Figure 9:
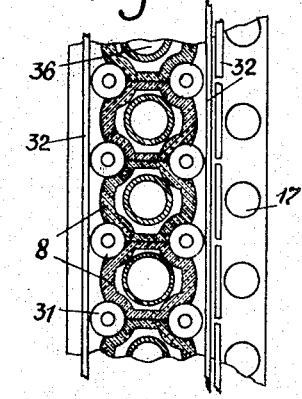

In the embodiment of my invention according to Figs. 6 and 7, the discharge chambers are closed by caps or covers 33 having outlet valves 34. The container 1 may be closed by an airtight cover 35 and can then be evacuated. The electrolytic treatment of the liquid may then be carried out under reduced pressure or vacuum which is advantageous for certain purposes. The gases which develop in the discharging chambers and which would create a pressure in these chambers can blow out through the outlets 34.

While I believe the above described embodiments of my invention are preferred embodiments, I wish it to be understood that I do not desire to be limited to the exact details of process, design and construction shown and described, for obvious modifications will occur to a person skilled in the art. Particularly the sluices and one way check or resistance provisions, may be constructed in many other ways and perform my invention equally well.

What I claim is:

1. An electrolytic cell for the treatment of liquids, having electrodes for the supply of positive and negative electric current for decomposing the liquid and creating a flow of ions, and partitions within said cell adapted to separate the electrodes for the positive current from the electrodes for the supply of negative current, said partitions being built of material which is impenetrable for the ions and having openings permitting a travel of said ions therethrough, said openings being adjustable as to size.

2. An electrolytic cell for the treatment of liquids, having electrodes for the supply of positive and negative electric current for decomposing the liquid and creating a flow of ions, and partitions within said cell adapted to separate the electrodes for the positive current from the electrodes for the supply of negative current, said partitions being built of material which is impenetrable for the ions and having openings permitting a travel of said ions therethrough, said openings being adjustable as to size and being adapted to be completely closed and shutting off the flow of the ions and the electric current entirely.

3. An electrolytic cell for the treatment of liquids, having electrodes for the supply of positive and negative electric current for decomposing the liquid and creating a flow of ions, and partitions within said cell adapted to separate the electrodes for the positive current from the electrodes for the supply of negative current, said partitions being built of material which is impenetrable for the ions and having openings permitting a travel of said ions therethrough, said openings being adjustable as to size, and additional partition provisions between said electrodes and said partitions.

4. An electrolytic cell for the treatment of liquids, having electrodes for the supply of positive and negative electric current for decomposing the liquid and creating a flow of ions, and partitions within said cell adapted to separate the electrodes for the positive current from the electrodes for the supply of negative current, said partitions being built of material which is impenetrable for the ions and having openings permitting a travel of said ions therethrough, said openings being adjustable as to size, and additional partition provisions between said electrodes and said partitions, said additional partition provisions consisting substantially of a plurality of layers of insulating rods crossing each other and leaving small openings between one another.

5. An electrolytic cell for the treatment of liquids, having electrodes for the supply of positive and negative electric current for decomposing the liquid and creating a flow of ions, partitions within said cell adapted to separate the electrodes for the positive current from the electrodes for the supply of negative current, said partitions being built of material which is impenetrable for the ions and having openings permitting a travel of said ions therethrough, said openings being adjustable as to size, additional partition provisions between said electrodes and said partitions, said additional partition provisions consisting substantially of a plurality of layers of insulating rods crossing each other and leaving small openings between one another, and flow-resisting provisions in front of said first-mentioned partitions.

6. An electrolytic cell for the treatment of liquids, having electrodes for the supply of positive and negative electric current for decomposing the liquid and creating a flow of ions, partitions within said cell adapted to separate the electrodes for the positive current from the electrodes for the supply of negative current, said partitions being built of material which is impenetrable for the ions and having openings permitting a travel of said ions therethrough, and provisions within said cell located in between said electrodes and said partitions, said provisions consisting of individual members of such configuration as to facilitate the flow of the liquid and products of the electrolysis in one direction and obstruct the flow of said liquids and products of the electrolysis in the other direction.

7. An electrolytic cell for the treatment of liquids, having electrodes for the supply of positive and negative electric current for the decomposition of the liquid and for creating a flow of ions, and partitions within said cell adapted to separate the electrodes for the positive current from the electrodes for the supply of negative current, said partitions being built of material which is impenetrable for the ions, said partitions having sluice-like provisions permitting the migration of said ions therethrough, said sluice-like provisions consisting substantially of elastic hollow bodies adapted to be internally supplied with variable amounts of air, the size of said bodies depending upon the amount of air supplied to them.

8. An electrolytic cell for the treatment of liquids, having electrodes for the supply of positive and negative electric current for decomposing the liquid and creating a flow of ions, and partitions within said cell adapted to separate the electrodes for the positive current from the electrodes for the supply of negative current, said partitions being built of material which is impenetrable for the ions and having openings permitting a travel of said ions therethrough, said partitions having sluice-like provisions consisting substantially of elastic bodies of variable size, means adapted to voluntarily change the size of said bodies, said bodies filling and completely closing said openings when brought up to full size by said means for varying the size of said bodies.

9. An electrolytic cell for the treatment of liquids, having electrodes for the supply of positive and negative electric current for decomposing the liquid and creating a flow of ions, and partitions within said cell adapted to separate the electrodes for the positive current from the electrodes for the supply of negative current, said partitions being built of material which is impenetrable for the ions and having openings permitting a travel of said ions therethrough, said partitions having sluice-like provisions consisting substantially of elastic hollow bodies adapted to be internally supplied with variable amounts of air, the size of said bodies depending upon the amount of air supplied, said bodies abutting against said partitions and completely closing said openings when brought to their full size by sufficient supply of air.

10. An electrolytic cell for the treatment of liquids, having electrodes for the supply of positive and negative electric current for decomposing the liquid and creating a flow of ions, and partitions within said cell adapted to separate the electrodes for the positive current from the electrodes for the supply of negative current, said partitions being built of material which is impenetrable for the ions, said partitions having sluice-like provisions permitting the migration of said ions therethrough, said sluice-like provisions consisting substantially of elastic hollow bodies adapted to be internally supplied with variable amounts of air, the size of said bodies depending upon the amount of air supplied to them, and support members for and within said elastic bodies.

11. An apparatus for the electrolytic treatment of liquids consisting of a container for the liquid, partitions subdividing said container into a plurality of chambers, said chambers being individually provided with electrodes charged with positive electricity and other chambers with electrodes charged with negative electricity, said electrodes being provided on one side with insulating screens, the insulating screens of the positively charged electrodes facing the insulating screens of the negatively charged electrodes, and said positive electrodes themselves facing away from the negatively charged electrodes.

12. An apparatus for the electrolytic treatment of liquids consisting of a container for the liquid, partitions subdividing said container into a plurality of chambers, said chambers being individually provided with a plurality of electrodes charged with positive electric current and other chambers with a plurality of electrodes charged with negative electric current, said chambers being equipped with fittings extending transversely through said chambers and forming collecting pockets within said chambers wherein the products of the electrolytic treatment are collected, said electrodes also extending transversely through said chambers and parallel to said fittings and being interspersed between said fittings.

13. An apparatus for the electrolytic treatment of liquids consisting of a container for the liquid, partitions subdividing said container into a plurality of adjacent compartments, each of said compartments being provided with a plurality of electrodes, whereby the electric charge of all electrodes associated with one compartment is the same, and the charge of the electrodes of two adjacent compartments is opposite, said compartments being equipped with fittings forming collecting pockets within said compartments, wherein the products of the electrolytic treatment are collected, said fittings and said electrodes associated with the same of said compartments being arranged in rows, whereby the fittings alternate with the electrodes and only small passages are left open between the electrodes and the fittings.

14. An apparatus for the electrolytic treatment of liquids consisting of at least one chamber provided with negatively charged electrodes, one chamber provided with positively charged electrodes and a chamber adjacent to and in between said chambers provided with electrodes, said last mentioned chamber being equipped with supply means for the liquid, said chambers which are provided with electrodes being individually closed by gas-tight covers and having individual valve means for the removal of the gas developing during the electrolytic treatment.

KARL KAISSER.

Patented June 4, 1935

2,004,066

UNITED STATES PATENT OFFICE 2,004,066

TERTIARY BUTYL ACETIC ACID

Frank C. Whitmore, State College, Pa., August H. Homeyer, St. Louis, Mo., and Walter R. Trent, State College, Pa., assignors to Mallinckrodt Chemical Works, St. Louis, Mo., a corporation of Missouri No Drawing. Application April 17, 1933, Serial No. 666,511

2 Claims. (Cl. 260—112)

This invention relates to carboxylic acids including a carbon atom to which four other carbon atoms are attached, and with regard to certain more specific features, to tertiary butyl acetic acid.

Among the several objects of the invention may be noted the provision of a product tertiary butyl acetic acid of a high degree of purity, and which may be made from commonly obtainable materials with a minimum of complicated procedures; and the provision of a product tertiary butyl acetic acid which is readily reactive as an intermediate in the preparation of several pharmaceutical and other products. Other objects will be in part obvious, and in part pointed out hereinafter.

The invention accordingly comprises the elements and combinations of elements, and features of composition which will be exemplified in the products hereinafter described, and the scope of the application of which will be indicated in the following claims.

As set forth in several copending applications for Letters Patent of the same assignee, it has recently been determined that certain organic products including as a constituent thereof a carbon atom linked to four aliphatic carbon atoms, such as is represented by the type formula:

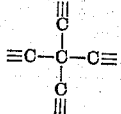

have valuable properties, particularly in the field of hypnotics, sedatives, soporifics, bactericides, and analgesics. This arrangement, whereby a carbon atom is linked to four aliphatic carbon atoms, will hereinafter be referred to as a "neopentyl" arrangement.

One of the most valuable intermediates for the preparation of these neopentyl-including substances comprises tertiary butyl acetic acid, which may be represented by the formula:

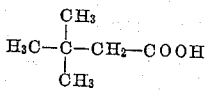

This compound, for example, esterifies in several manners to form esters which are themselves hypnotics and sedatives, and it may be carried through a synthesis whereby it is converted into a higher homologous neopentyl halide which itself constitutes a valuable intermediate for the preparation of hypnotics and the like of a different type.

The only significant reference to tertiary butyl acetic acid in the literature is found in the works of Maurice Delacre, as reported in the Bulletin de la Classe des Sciences, Royale Academie de Belgique for 1906, at pages 7 through 41. Faithful repetition of the work of Delacre, as presented in such report, has led to a serious doubt that Delacre ever succeeded in preparing tertiary butyl acetic acid, at least tertiary butyl acetic acid of such a purity as to permit of its satisfactory use as an intermediate in the manners above set forth. For example, Delacre reports that his product had a melting point of −11° C., and a boiling point of 185 to 190° C., while the tertiary butyl acetic acid of the present invention (as described hereinafter) has, by numerous checks, a melting point of about 7° C., and a boiling point of 183° C. at a pressure of 739 mm., which is comparable to Delacre's pressure.

The tertiary butyl acetic acid of the present invention is made in substantially the following manner:

Diisobutylene (which may be obtained commercially) is first oxidized with a dichromate and sulphuric acid, in the following manner:

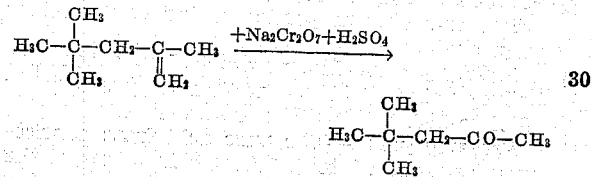

which may be termed 2,2-dimethyl pentanone-4. When, now, this substance is oxidized with a hypohalite the following reaction takes place:

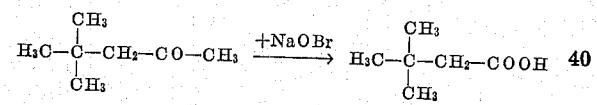

thus yielding the desired tertiary butyl acetic acid.

*Example*

900 grams of diisobutylene (b. p. about 100° C.) were combined with a solution of 2700 grams of crude sodium dichromate in 3000 cc. of water. To this was added, over a two-day period, a mixture of 2160 cc. concentrated sulphuric acid and 2600 cc. of water. The mixture was then stirred for an additional eight days, making ten days in all. Finally, the mixture was fractionated, and a yield of about 293 grams of 2,2-dimethyl pentanone-4 boiling at about 122 to 126° C. was obtained. Said product had an index of refraction $$(n_D^{20})$$

of about 1.4028.

1000 grams of finely crushed ice and a solution of 525 grams of sodium hydroxide in 2000 cc. of ice-cold water were placed in a three-neck flask fitted with a mercury-sealed stirrer, a dropping funnel, and a thermometer. The flask was surrounded by a bath of ice and salt water. 240 cc. of bromine was then added, through the dropping funnel, over a period of one hour, the sodium hydroxide solution being stirred in the meanwhile. The temperature remained below 0° C. After all of the bromine had been added, 171 grams of the 2,2-dimethyl pentanone-4 made as above were added during ten minutes through the dropping funnel. The temperature of the reaction mixture was —3° C. Two hours after adding the ketone the temperature was 5° C. and the solution was yellow. Four hours later the temperature was 15° C. and the solution was almost colorless. Stirring was continued over night. On the following day the thermometer was replaced by a condenser arranged for distillation, the cooling bath was removed, and the flask was heated by a Bunsen burner. Stirring was continued throughout the distillation, which was stopped when no more oil came over. The distillate amounted to 600 cc. of water and 175 grams of a mixture of bromoform and carbon tetrabromide which was partly solid. After the residue in the flask had cooled, it was acidified by the addition of 600 cc. of concentrated sulphuric acid through the dropping funnel. The delivery end of the dropping funnel dipped below the liquid level in the flask during the acid addition. The mixture was then steam-distilled, the distillate amounting to 1100 cc. The oil layer, which separated, weighed 151 grams. The aqueous layer was extracted with 100 cc. of ether and the ether extract was evaporated, the residue (17 grams) being added to the oil fraction. The acid product thus obtained was dried and purified by fractionation at reduced pressure (about 25 mm.), all matter coming over between 95 and 96° C.

The following properties of the pure tertiary butyl acetic acid were noted:

*Boiling point.*—The pure acid had a constant boiling point of 96° C. at 26 mm. pressure, or 183.0 to 183.3° C. at 739 mm. pressure.

*Freezing point.*—The pure acid froze consistently at from 6.3 to 7.0° C. On fractions of the acid not quite so carefully purified, the freezing point dropped to approximately 0° C.

*Index of refraction.*—The index of refraction of the pure acid $$(n_D^{20})$$

was determined to be about 1.4096.

*Density.*—The density of the pure acid appears to be about $$d_{20}^{20}$$

as 0.9140 and $$d_4^{20}$$

as 0.9124.

*Molecular refraction.*—Calculated from the above index of refraction and density, about 31.48. This substantially checked the theoretical value calculated from the atomic refractions of Eisenlohr, which is 31.46.

*Physical form.*—At room temperatures, a heavy colorless oily liquid. The solid form is white and has a needle-like crystalline structure.

The above shows conclusively that a pure tertiary butyl acetic acid having the formula $(CH_3)_3C-CH_2-COOH$ has been formed, and that it is a different substance from the alleged tertiary butyl acetic acid of Delacre.

In view of the above, it will be seen that the several objects of the invention are achieved and other advantageous results attained.

As many changes could be made in carrying out the above compositions without departing from the scope of the invention, it is intended that all matter contained in the above description shall be interpreted as illustrative and not in a limiting sense.

We claim:

1. Tertiary butyl acetic acid having approximately the following properties:

| | |
|---|---|
| Boiling point | 183° C. at 739 mm. |
| Freezing point | 6.3 to 7.0° C. |
| Index of refraction, $n_D^{20}$ | 1.4096 |
| Density— | |
| $d_{20}^{20}$ | 0.9140 |
| $d_4^{20}$ | 0.9124 |

2. Tertiary butyl acetic acid having approximately the following properties:

| | |
|---|---|
| Boiling point | 183° C. at 739 mm. |
| Freezing point | 6.3 to 7.0° C. |

FRANK C. WHITMORE.
AUGUST H. HOMEYER.
WALTER R. TRENT.